United States Patent [19]

Betterton et al.

[11] Patent Number: 4,982,607

[45] Date of Patent: Jan. 8, 1991

[54] COMPOSITE CYLINDER FOR A MINI OIL PRESSURE TRANSDUCER

[75] Inventors: Joseph T. Betterton, Arab; Alfred H. Glover, Decatur; Thomas S. McKee, Madison, all of Ala.

[73] Assignee: Acustar, Inc., Troy, Mich.

[21] Appl. No.: 501,224

[22] Filed: Mar. 29, 1990

[51] Int. Cl.$^5$ ............................ G01L 7/08; G01L 9/02
[52] U.S. Cl. ......................................... 73/725; 73/115; 73/746; 338/42
[58] Field of Search ................. 73/725, 746, 756, 115; 338/42

[56] References Cited

U.S. PATENT DOCUMENTS

| | | | |
|---|---|---|---|
| 3,321,594 | 5/1967 | Reise et al. | 200/83 R |
| 3,504,324 | 3/1970 | Creager | 73/725 |
| 4,255,630 | 3/1981 | Hire et al. | 200/81.4 |
| 4,449,112 | 5/1984 | Gould | 338/49 |
| 4,452,202 | 6/1984 | Meyer | 123/494 |
| 4,524,255 | 6/1985 | Haag | 200/83 R |
| 4,581,941 | 4/1986 | Obermann et al. | 73/728 |
| 4,805,460 | 2/1989 | Betterton et al. | 73/725 |
| 4,807,478 | 2/1989 | Betterton et al. | 73/725 |

Primary Examiner—Donald O. Woodiel
Attorney, Agent, or Firm—Kenneth H. MacLean, Jr.

[57] ABSTRACT

An improved pressure transducer to measure and indicate fluid pressure levels including a housing in which a piston assembly is movable in response to pressure changes, the housing being of a composite material of metal and plastic and having grooves therein, the piston having bosses formed thereon to be engaged within the grooves of the housing to prevent rotation of the piston. The transducer is also designed to facilitate grounding of an electrical contact assembly located within the housing. The external portion of the housing may be formed in a hexagonl shape to facilitate installation and removal of the unit.

12 Claims, 4 Drawing Sheets

COMPOSITE CYLINDER FOR A MINI OIL PRESSURE TRANSDUCER

BACKGROUND AND SUMMARY OF THE INVENTION

The present invention relates generally to oil pressure transducers used with an internal combustion engine in an automobile, and more particularly, to improvements in a composite cylinder for a mini oil pressure transducer used to measure oil pressure and to produce a corresponding indicator signal.

Modern automobiles typically utilize a fuel injection system for the engine which includes an electric motor to power a fuel pump. In addition to the already described oil pressure indicating function, it is sometimes desirable to incorporate an electrical switch mechanism in an oil pressure transducer to control energization of the fuel pump in response to oil pressure. Specifically, it is desirable to activate the fuel pump motor only after a minimum oil pressure is reached.

A number of United States patents generally disclose a pressure transducer and switch mechanism, either singularly or in combination. For example, U.S. Pat. No. 3,321,594 to Reise, discloses a fluid pressure actuated switch with a diaphragm sensor operatively associated with electrical contacts for controlling an electric fuel pump motor. U.S. Pat. No. 4,255,630 to Hire, also discloses an electrical switch which is responsive to fluid pressure to control a fuel pump motor. U.S. Pat. No. 4,524,255 to Haag, discloses a switch with a movable diaphragm responsive to fluid pressure to open and close contacts of an electrical circuit. U.S. Pat. No. 4,581,941 to Obermann, discloses a fluid pressure transducer including a switch therein, adapted to control a fuel pump motor and utilizes a diaphragm and contacts.

Several other patents have been found which disclose pressure transducers without the switching device. These include U.S. Pat. Nos. 3,504,324; 4,449,112; and 4,452,202. All of the patents discussed or identified previously, broadly disclose a pressure transducer with or without a switching mechanism but do not specifically disclose the desirable features in the fluid pressure transducer with a switching device, as described hereinafter.

The present invention incorporates desirable design features into the cylinder and piston of a mini oil pressure transducer. Specifically, the cylinder is made of a metal material interiorly, and a plastic material exteriorly. Grooves are formed into the metal cylinder inside walls to allow for engagement of bosses formed on the piston to prevent rotation of the piston as it moves within the cylinder. The plastic exterior configuration of the cylinder may be molded into a hexagon shape to provide wrenching flats for easier installation and removal of the unit. The perimeter portion of the grooves formed in the metal part of the cylinder also assist in preventing rotation of the plastic external part of the cylinder with respect to the metal internal part of the cylinder. The metal portion of the cylinder provides an electrical ground path to the base of a connector end. This is more economical to construct than insert molding the ground strap in the housing wall as previously done.

Therefore, an object of the invention described and claimed in this application is to provide a simple, compact, inexpensive yet reliable fluid pressure responsive transducer having operative parts and assemblies which are conveniently assembled together and therefore, easily serviced and that are associated together in a manner which prohibits rotation of the piston within the cylinder and of the interior metal portion of the cylinder within the exterior plastic portion of the cylinder. The foregoing and other objects and advantages will become more apparent when viewed in light of the accompanying drawings and following detailed description.

DESCRIPTION OF THE DRAWINGS

FIG. 5 is a view taken substantially in the direction of arrow 5 in FIG. 3; and

DESCRIPTION OF A PREFERRED EMBODIMENT

Figure 1:
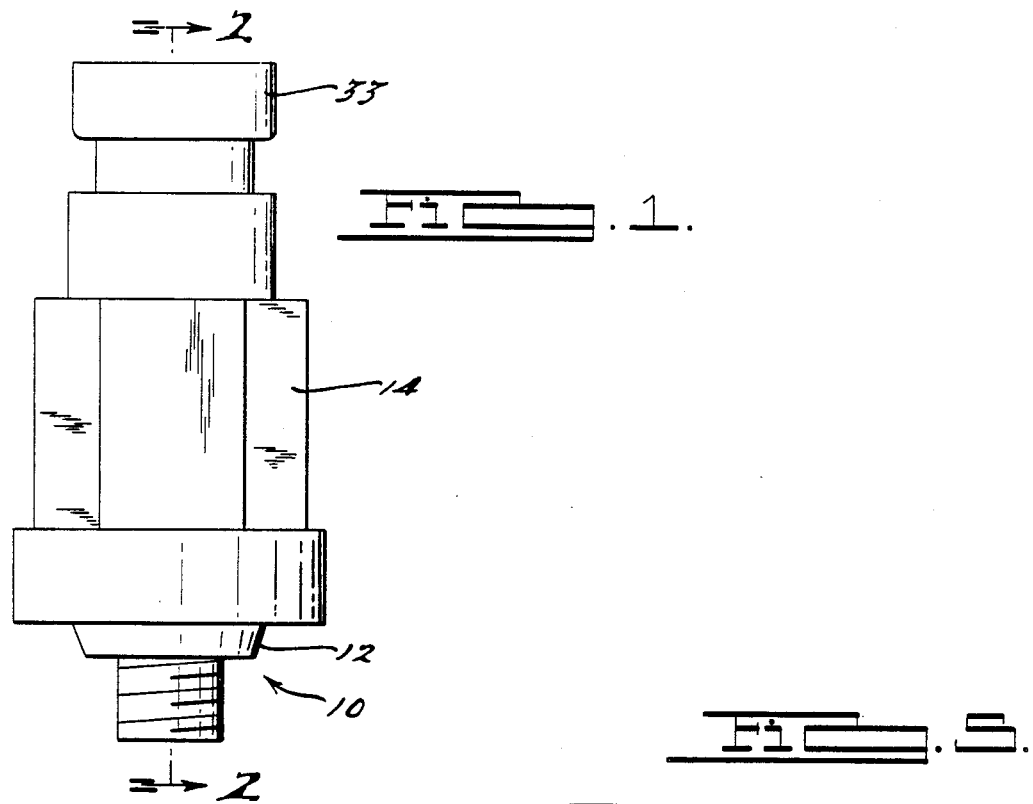
FIG. 1 is an elevation view of the mini oil pressure transducer in accordance with the present invention.

Referring now to the drawings, and particularly FIG. 1, there is illustrated a mini oil pressure transducer assembly generally indicated at 10 and of a general type widely known in the automotive industry. While the transducer 10 will be described in general, a more detailed description of a similar transducer is found in related U.S. Pat. No. 4,805,460 issued Feb. 21, 1989, to Joseph T. Betterton, et al., the patent being specifically incorporated herein by reference.

Figure 3:
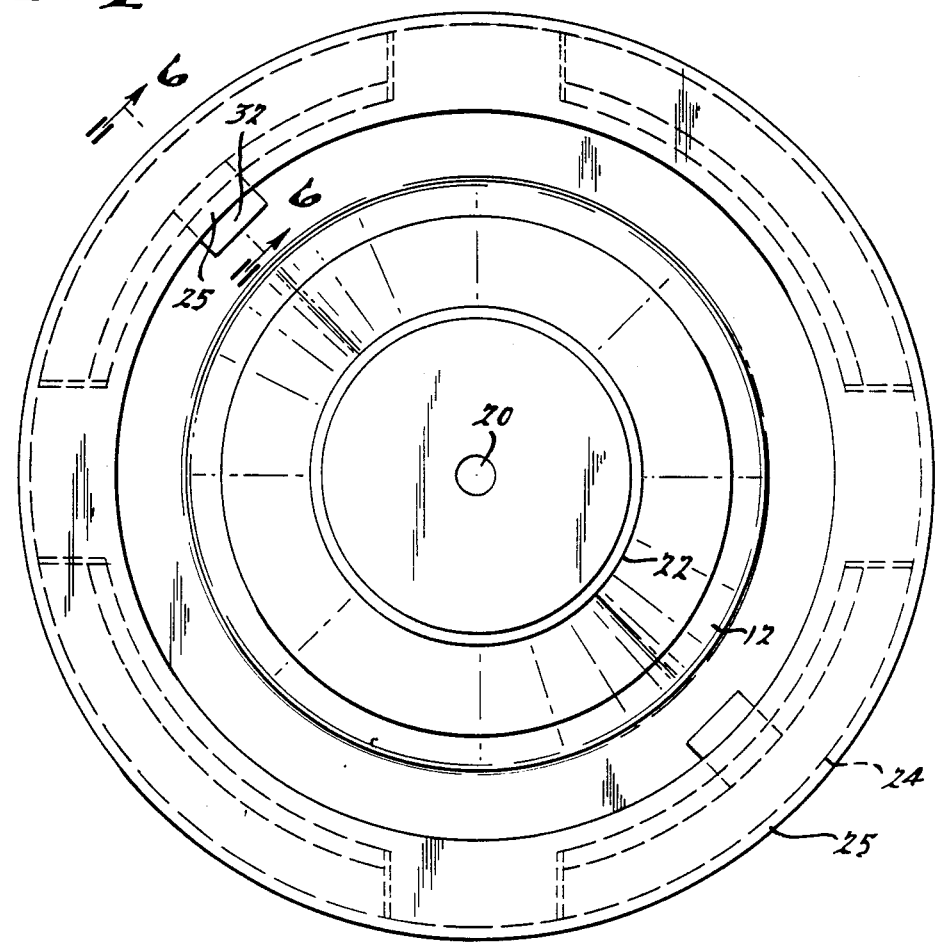
FIG. 3 is a section view of the transducer of FIG. 2, the section being taken along lines 3—3 thereof.
Figure 2:
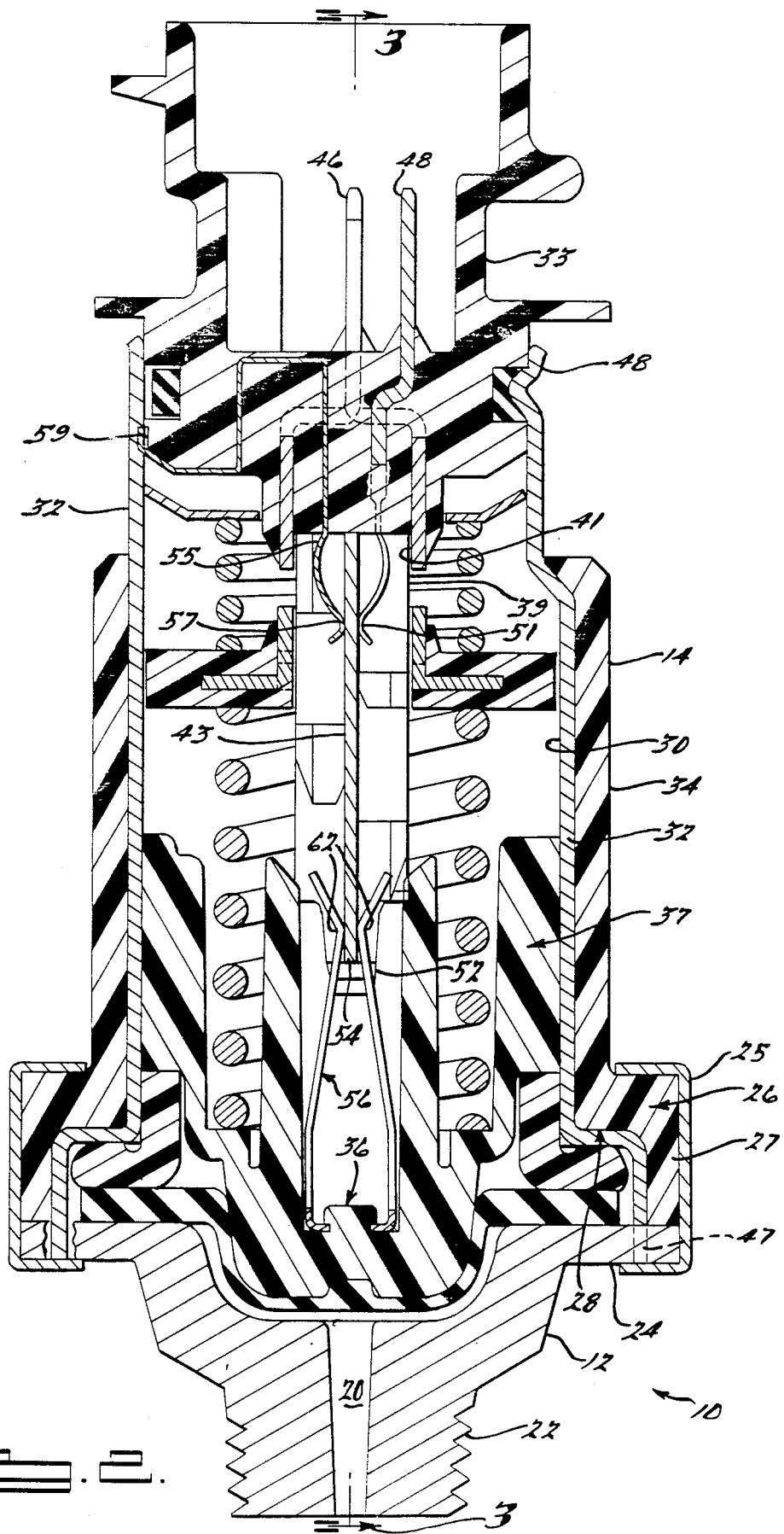
FIG. 2 is an enlarged section view of the transducer of FIG. 1, the section being taken along lines 2—2 thereof.
Figure 3:
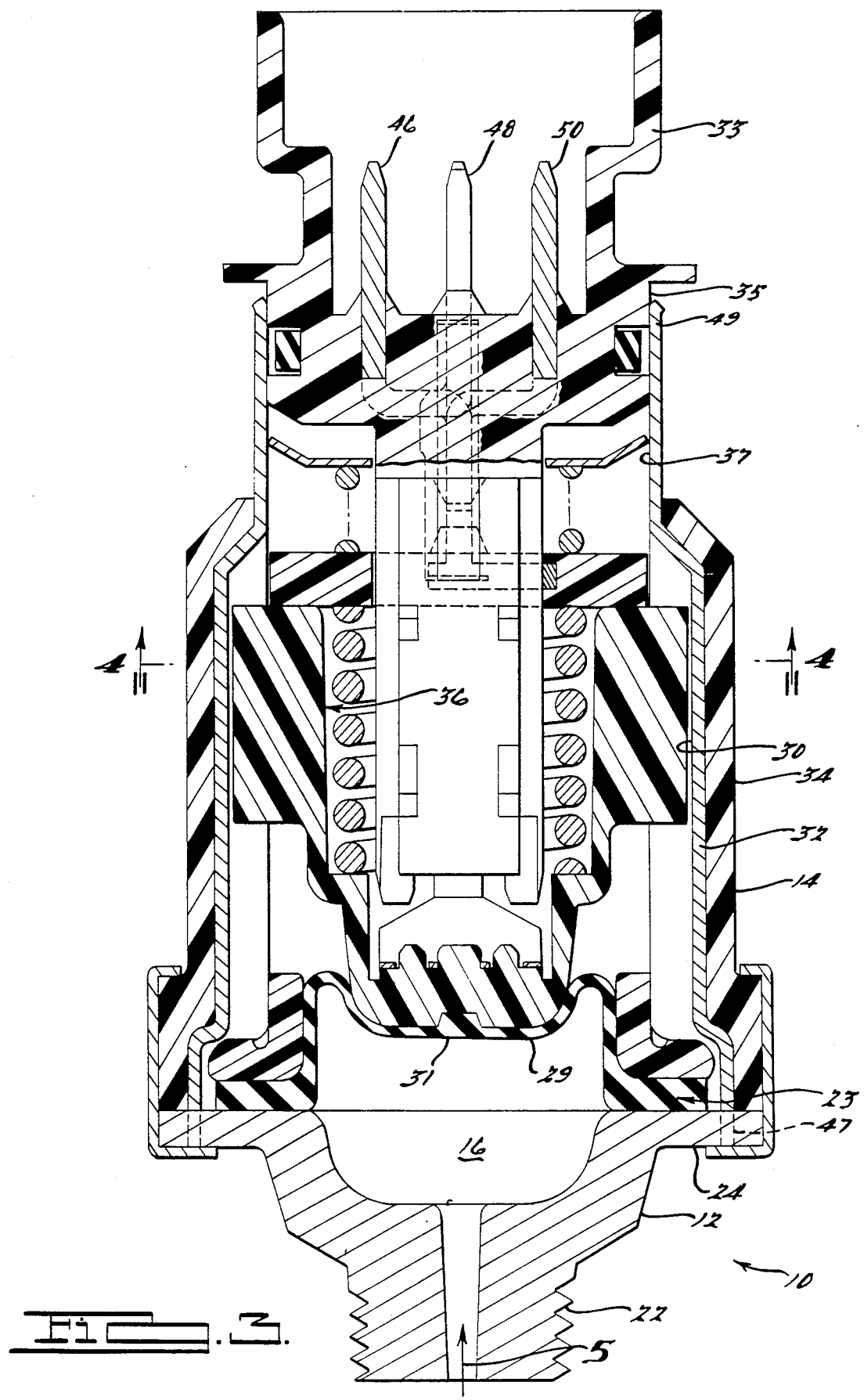

Transducer assembly 10 includes two housing portions 12 and 14 shown in better detail in FIGS. 2 and 3. Housing portion 12 has a generally cup shaped configuration defining a generally hollow interior 16 as shown in FIG. 3. The housing 12 has a threaded cylindrical portion 22 which is adapted to attach assembly 10 to an automobile engine. Specifically, the portion 22 connects opening 20 to a pressurized oil lubrication passage of the engine. Resultantly, pressurized oil is admitted through the opening 20 to the interior space 16. The upper end of the housing 12 includes a radially outwardly extending flange portion 24 for engagement with the other housing portion 14.

Figure 4:
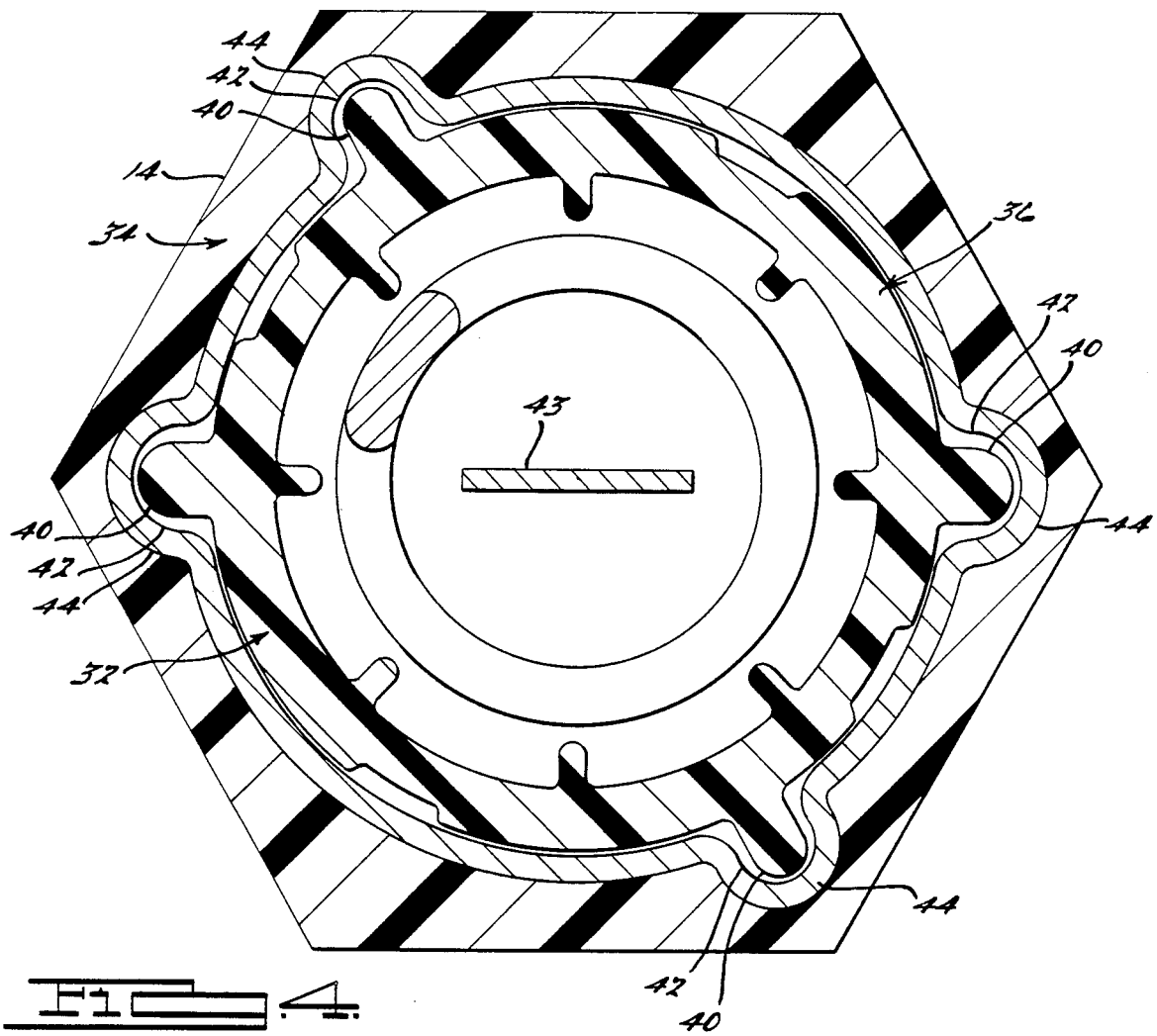
FIG. 4 is a section view taken along section lines 4—4 in FIG. 3.
Figure 6:
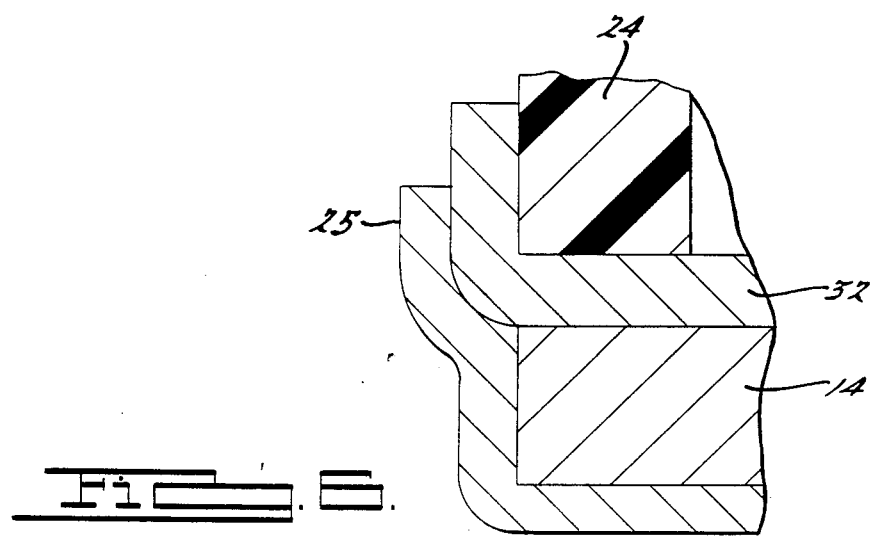
FIG. 6 is a fragmentary section view taken along section lines 6—6 in FIG. 5.

The housing portion 14 has a substantially tubular configuration as seen from FIGS. 1 and 2. The outer surface configuration of housing 14 is preferably hexagonally shaped as shown in FIG. 4 so that a tool may be applied to rotate the transducer during mounting on an engine. The lower end portion of housing 14 has a thickened and radially outwardly extending flange portion 26 and an annular flange portion 27 extending axially from the outer end of flange 26 so as to define an annularly configured recess 28. The outside diameter of flange 27 is substantially equal to approximately the outside diameter of flange portion 24 of member 12. Within the recess 28 is secured an edge portion 23 of a diaphragm member 29. A metal crimp ring 25 is provided to fit around and securely hold both housing members 12, 14 together as best shown in FIGS. 3, 5 and 6.

The diaphragm 29 includes a mid-portion 31 which is exposed on one side to the oil in space 16. The mid-portion 31 is operatively connected at the other upper side to a piston member 36 which has a generally inverted cup shaped and tubular configuration. The piston member 36 includes a substantially cylindrical main body 37 adapted to be reciprocally received within an elongated bore 30 provided in housing 14. The position of the piston 36 shown in FIG. 2 corresponds to a relatively low or zero fluid pressure in interior space 16. Likewise, the position of the piston 36 shown in FIG. 3 corresponds to a high fluid pressure in interior space 16.

The housing 14 has substantially concentric internal and external portions 32, 34. The internal portion 32 is formed from a metal while the external portion 34 is molded from a polymeric composition. The internal portion 32 may be insert molded to the external portion 34 and permanently fixed thereto. Piston member 36 is slidably disposed within housing 14 in response to oil pressure acting against diaphragm 29.

As best shown in FIG. 4, the outer surface of the piston member 36 is formed with bosses 40 which are sized and shaped to be moveably positioned within grooves 42 of the internal metal portion 32 of the housing 14. The bosses 40 cooperate with the grooves 42 to prevent the piston 36 from rotating as it reciprocates within the housing 14. In addition, the grooved portions 42 of the internal metal portion 32 of the cylinder 14 prevent the metal portion 32 of the cylinder 14 from rotating with respect to the plastic outer portion 34 of the cylinder 14. This is accomplished by the grooves 42 of the metal portion 32 fitting snugly into mating grooves 44 of the plastic portion 34 of the housing 14. The particular arrangement shown in FIG. 4 is indicative of one possible embodiment and it should be appreciated that other different patterns, arrangements and shapes of the bosses and grooves would fall within the scope of this invention.

A primary function of the pressure transducer 10 is to transmit an electrical signal or indicator corresponding to oil pressure levels sensed within the interior space 16 of housing 12. For passing this signal from the transducer 10, an electrical connector or terminal support member 33 is attached at the upper end of the housing 14 and is shown in FIG. 2. With reference to FIGS. 2 and 3, the terminal support member 33 has a generally cylindrically configured base portion 35 which is insertably received in a cylindrical recess 37 of housing 14. The base portion 35 is dimensioned with respect to the cylindrical recess 37 of housing 14 so that the terminal support member 33 may be axially moved in the recess 37. The clearance or fit between the terminal support member 33 and the recess 37 is preferably made very close so that a substantial force required to move the terminal support member 33 to the desired axial location or calibration position. A central depending portion 39 of the terminal support member 33 extends outwardly from an opening 41 in the lower end of the terminal support member 33 into the interior of housing 14 and in an axial direction therethrough. The central portion 39 supports an elongated and flat resistor board 43 in a generally axial orientation within the interior of housing 14. A plurality of terminals 46, 48, 50 extend from the terminal support member 33.

As perhaps best shown in FIGS. 2 and 3, the depending portion 39 of member 33 includes a lower or bottom edge portion 52 which engages the bottom edge portion 54 of the resistor board 43. An electrical contact assembly 56 slidingly engages grids on the resistor board 43. As oil pressure increases through the opening 20, it forces the piston 36 to move up axially within the housing 14 while the resistor board 43 is stationary. Resultantly, contacts 62 slide along the board 43. The previously described relative movements change the electrical resistance between the terminal 48 and ground or the engine block to which the transducer 10 is mounted. This produces a variable electrical indicating signal corresponding to oil pressure levels.

Another improvement incorporated in the above mentioned design, is that the metal portion 32 of the housing 14 provides an electrical ground path to housing 12. One end 47 of the inner metal portion 32 of the cylinder 14 is in contact with the housing 12, as shown in FIG. 6, which provides a ground path extending from an opposite end 49 of the metal portion 32 which is in contact with the terminal support member 33 of the transducer 10. Current enters terminal 48 and flows to the resistor board at contact 51. The resistance is measured as the length from contact 51 to contacts 62. As oil pressure increases the piston 36 will move up causing contacts 62 to move up thereby lessening the resistance. A ground strap 55 makes contact with the resistor board 43 at contact 57 and leads to a point 59 on the metal portion 32 of the cylinder 14.

It is thought that the improved composite cylinder of the present invention and many of its attendant advantages will be understood from the foregoing description and it will be apparent that various changes may be made in the form and construction of the components thereof without departing from the spirit and scope of the invention or sacrificing all of its material advantages, the form hereinbefore described being merely a preferred or exemplary embodiment thereof.

What is claimed is:

1. An improved fluid pressure transducer, comprising:
   generally hollow first and second housing members attached together in an end-to-end manner;
   a diaphragm member with a peripheral edge and a flexible mid-portion, said edge being secured between said housings and said mid-portion having first and second surfaces whereby said first surface is exposed to pressurized fluid thereby generating a net pressure force on said mid-portion;
   a piston member having an end portion operatively attached to said mid-portion of said diaphragm, an integral tubular portion of said piston extending within said second housing, whereby said piston is supported for axial reciprocation in said interior of said second housing in response to the movements of said mid-portion; and
   said second housing having generally concentric interior and exterior portions, said interior portion being formed from a metal and said exterior portion being formed from a plastic material.

2. The improved fluid pressure transducer of claim 1, wherein said interior metal portion of said second housing has a plurality of grooves formed therein.

3. The improved fluid pressure transducer of claim 2, wherein said piston member has a plurality of bosses formed thereon to be movably positioned within said grooves of said second housing.

4. The improved fluid pressure transducer of claim 1, wherein said interior metal portion provides a ground path from a terminal support member situated in the top of said second housing to said first housing member.

5. The improved fluid pressure transducer of claim 1, wherein said external plastic portion of said second housing member is formed with a hexagonal exterior surface shape.

6. The improved fluid pressure transducer of claim 5, wherein said interior metal portion of said housing acts to reinforce said external plastic portion to resist damage during installation of said transducer by applying torque to said hexagonal exterior surface.

7. The improved fluid pressure transducer of claim 1, wherein said exterior plastic portion is molded about said interior metal portion.

8. The improved fluid pressure transducer of claim 1, further comprising: a terminal support member insertably adjustable within said second housing.

9. The improved fluid pressure transducer of claim 8, wherein said interior metal portion is deformed at one end thereof to lock said terminal support member in place.

10. An improved fluid pressure transducer, comprising:
- generally hollow first and second housing members attached together in an end-to-end manner;
- a diaphragm member with an edge portion and a flexible mid-portion, said edge being attached between said housings and said mid-portion having first and second surfaces whereby said first surface is exposed to pressurized fluid thereby generating a net pressure force on said mid-portion;
- a piston member having an end portion operatively attached to said mid-portion of said diaphragm, an integral tubular portion of said piston extending within said second housing, whereby said piston is supported for axial reciprocation in said interior of said second housing corresponding to the movements of said mid-portion;
- said second housing having generally concentric interior and exterior portions, said exterior portion being formed from a plastic and molded around said interior portion which is formed from a metal;
- said second housing having an outwardly extending end wall which defines an end recess; and
- a terminal support member insertably adjustable within said recess and having an elongated central portion which extends generally co-axially into the interior of said second housing, said interior metal portion is deformed at one end thereof to lock said terminal support member in place.

11. An improved fluid pressure transducer, comprising:
- generally hollow first and second housing members attached together in an end-to-end manner;
- a diaphragm member with an edge portion and a flexible mid-portion, said edge being attached between said housings and said mid-portion having first and second surfaces whereby said first surface is exposed to pressurized fluid thereby generating a net pressure force on said mid-portion;
- a piston member having an end portion operatively attached to said mid-portion of said diaphragm, an integral tubular portion of said piston extending within said second housing, whereby said piston is supported for axial reciprocation in said interior of said second housing corresponding to the movements of said mid-portion;
- said second housing having generally concentric interior and exterior portions, said interior portion being formed from a metal and said exterior portion being formed from a plastic;
- said interior metal portion of said second housing having a plurality of grooves formed therein;
- said piston member having a plurality of bosses formed thereon to be engagably positioned within said grooves of said second housing;
- said internal metal portion of said second housing, providing an electrical ground path to said first housing; and
- said external plastic portion of said second housing member being formed with a hexagonal exterior surface shape.

12. An improved fluid pressure transducer, comprising:
- generally hollow first and second housing members attached together in an end-to-end manner;
- a diaphragm member with an edge portion and a flexible mid-portion, said edge being attached between said housings and said mid-portion having first and second surfaces whereby said first surface is exposed to pressurized fluid thereby generating a net pressure force on said mid-portion;
- a piston member having an end portion operatively attached to said mid-portion, an integral tubular portion of said piston extending within said second housing, whereby said piston is supported for axial reciprocation in the interior of said second housing corresponding to the movements of said mid-portion;
- said second housing having an outwardly extending end wall which defines an end recess;
- a terminal support member insertably adjustable within said recess and having an elongated central portion which extends generally co-axially into the interior of said second housing;
- an electrical circuit board attached to said terminal support member and extending in the axial direction with respect to said piston member and through the interior of said tubular piston, an electrical resistance grid on at least one exposed surface of said circuit board;
- a contact support member attached to said piston for movements therewith and having a contact thereon adapted to slide along said elongated grid as said piston moves relative to said stationary circuit board;
- said central portion of said terminal support member is separated into two spaced side edge portions to engage and support said board yet expose the surface of said board and said grid thereon to said contact portion of said assembly, whereby the resistance of a pressure indicating circuit including said contact and said circuit board varies in response to the relative movement therebetween and corresponding to the pressure of fluid adjacent to said diaphragm;
- said second housing member having generally concentric interior and exterior portions, said interior portion being formed from a metal and said exterior portion being formed from a plastic material;
- said interior metal portion of said second housing having a plurality of grooves formed therein;
- said piston member having a plurality of bosses formed thereon to be engagably positioned within said grooves of said second housing; and
- said external plastic portion of said second housing member having a hexagonal exterior surface shape.

* * * * *